United States Patent [19]

Orii

[11] 4,368,022

[45] Jan. 11, 1983

[54] FEEDING APPARATUS IN PRESSING MACHINE

[75] Inventor: Masaru Orii, Machida, Japan

[73] Assignee: Kabushiki Kaisha Orii Jidoki Seisakusho, Japan

[21] Appl. No.: 292,216

[22] Filed: Aug. 12, 1981

[30] Foreign Application Priority Data

May 26, 1981 [JP] Japan .................................. 56-76215

[51] Int. Cl.³ .............................................. B30B 7/00
[52] U.S. Cl. ................................................... 425/343
[58] Field of Search ........................ 425/340, 343, 135

[56] References Cited

U.S. PATENT DOCUMENTS

| | | | |
|---|---|---|---|
| 2,230,880 | 2/1941 | Brown | 425/343 X |
| 3,519,521 | 7/1970 | Muller | 425/343 |
| 3,526,690 | 9/1970 | Bachman | 425/135 X |
| 3,883,631 | 5/1975 | Murray | 425/343 X |

Primary Examiner—J. Howard Flint, Jr.

Attorney, Agent, or Firm—Kane, Dalsimer, Kane, Sullivan and Kurucz

[57] ABSTRACT

A feeding apparatus in pressing machine which performs sequential predetermined pressing operations on a workpiece at two or more working positions spaced by given intervals, which includes a holder means provided in such a manner that it can be reciprocated between adjacent working positions a suction means that is held by said holder means and which stops applying suction to the workpiece at one of said working positions, and a pivoting mechanism for pivoting said holder means to a position where it does not interfere with the pressing operation of said pressing machine, the workpiece under suction of the suction means at one working position being sent to the next working position by the movement of the holder means and retracted to said non-interfering position by pivoting said holder means after said suction means stops applying suction to the workpiece and before the pressing machine starts to operate.

1 Claim, 5 Drawing Figures

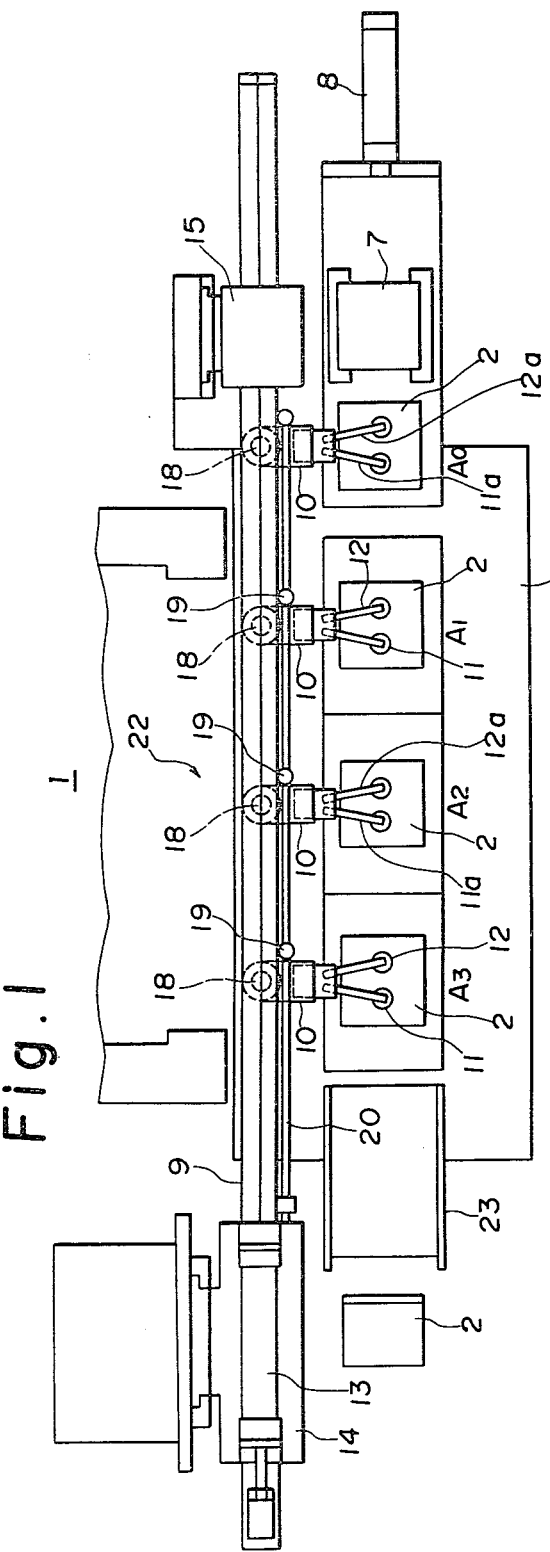
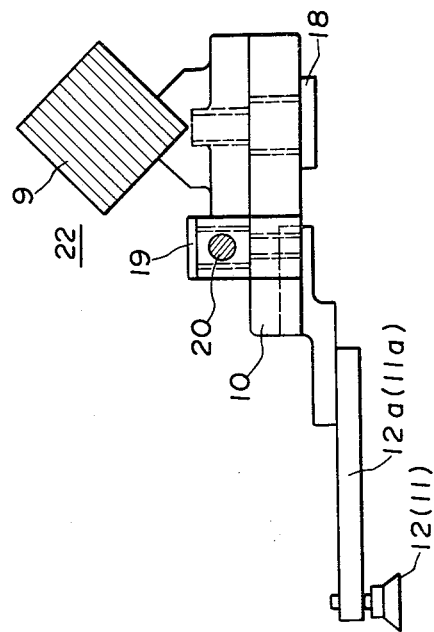

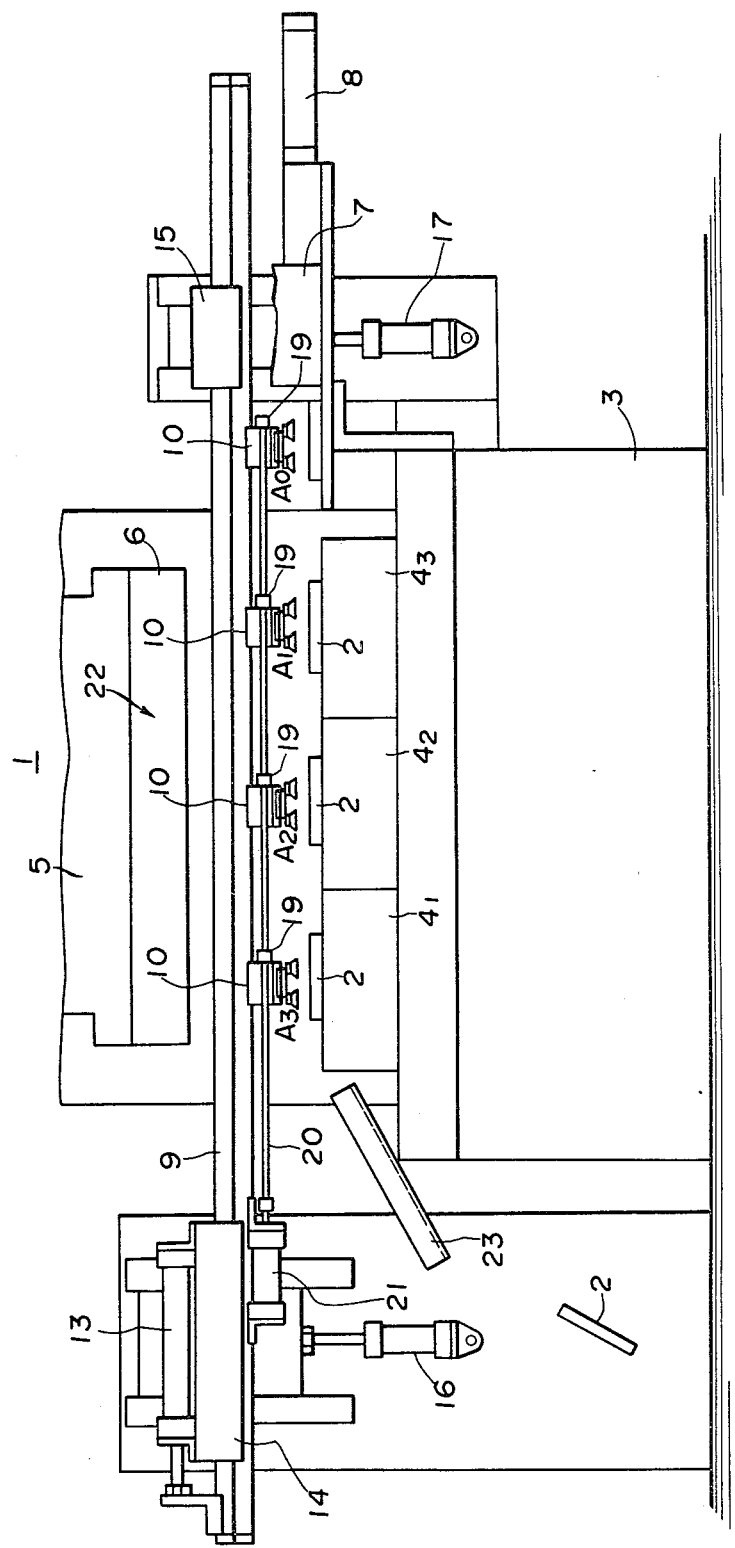

FEEDING APPARATUS IN PRESSING MACHINE

FIELD OF THE INVENTION

This invention relates to an apparatus for feeding the workpiece in a pressing machine, and more particularly, to a feeding apparatus that obviates the space for retraction of suction elements that has been provided between one working position and the next in the conventional system.

BACKGROUND OF THE INVENTION

A pressing machine is known which works the workpiece into predetermined shapes by performing different pressing operations at a plurality of working positions on the same press bed. Pressing machines of this type sometimes use a feed apparatus that transfers the workpiece from one working position to the next by moving along a slide bar a plurality of cups that apply suction to the workpiece at several portions of its surface. In this case, when the press machine is operating, the cups must be retracted to a position between one working position and the next so that they do not interfere with the operation of the machine. Before the pressing machine starts to work the workpiece, the conventional feed apparatus moves the slide bar by half the amount of the feed of the workpiece to retract the suction cups to a position between one working position and the next so that they will not interfere with the pressing operation. But this design calls for the provision of a reasonable space between adjacent working positions, and a press bed which is undesirably long in the direction of the feed of the workpiece is unavoidable.

Furthermore, when one pressing operation is completed, the conventional feed apparatus is not capable of returning the suction cups to the first working position without another movement of the slide bar, so the interval between one pressing operation and the next involves a fairly long time that is spent in only feeding the workpiece.

SUMMARY OF THE INVENTION

This invention has been accomplished to eliminate the above defects of the conventional feed apparatus. One object of this invention is to provide a novel feed apparatus that eliminates the space for retraction of suction elements that have been provided between one working position and the next in the conventional apparatus. The novel apparatus permits the size of a pressing machine to be reduced in the direction of the feed of the workpiece and achieves more efficient pressing operation. Such object of this invention can be achieved by an arrangement in which the holder of elements to apply suction to the workpiece is pivotally retracted to a position that does not interfere with the operation of an upper pressing mold.

PREFERRED EMBODIMENTS OF THE INVENTION

One preferred embodiment of this invention is now described by reference to the accompanying drawings, wherein;

FIGS. 1 and 2 are plan and front views respectively, of a feed apparatus in pressing machine according to one embodiment of this invention;

FIG. 5 is a longitudinal section of FIG. 4 taken on the line X—X.

Figure 3:
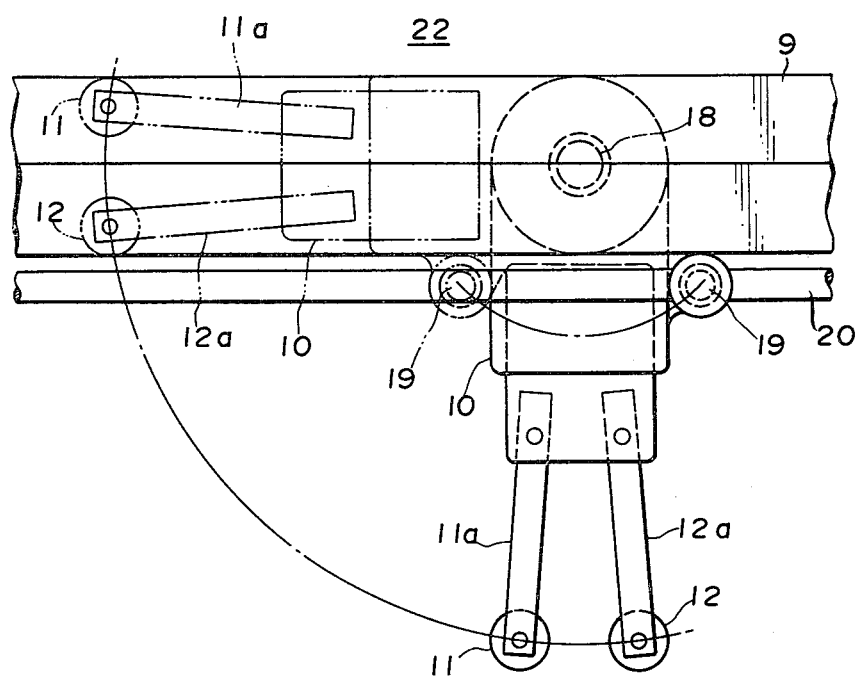
FIGS. 3 and 4 are plan and front views, respectively, of the essential parts of the feed apparatus of FIGS. 1 and 2.

A pressing machine generally indicated by the numeral 1 in FIGS. 1 and 2 is so designed that it achieves three kinds of working sequentially on a workpiece 2. Three lower molds $4_1$, $4_2$ and $4_3$ are in predetermined working positions $A_1$, $A_2$ and $A_3$ on a bolster 4 fixed to a press bed, and by pressing down on upper mold 6 with a ram 5, the workpiece is given the predetermined kinds of working simultaneously. The workpiece 2 is supplied to a feed position Ao through a pusher feed mechanism 7 on the right side (feed side) of the pressing machine 1 by means of the action of a cylinder 8. Above the feed position Ao and the three working positions $A_1$, $A_2$ and $A_3$, a square slide bar 9 is positioned in such a manner that it connects these four positions on a straight line. Four holders 10 are attached to the slide bar 9 at generally equal distances, and they hold suction cups 11, 12 by two fingers 11a, 12a connected to each holder.

Figure 4:
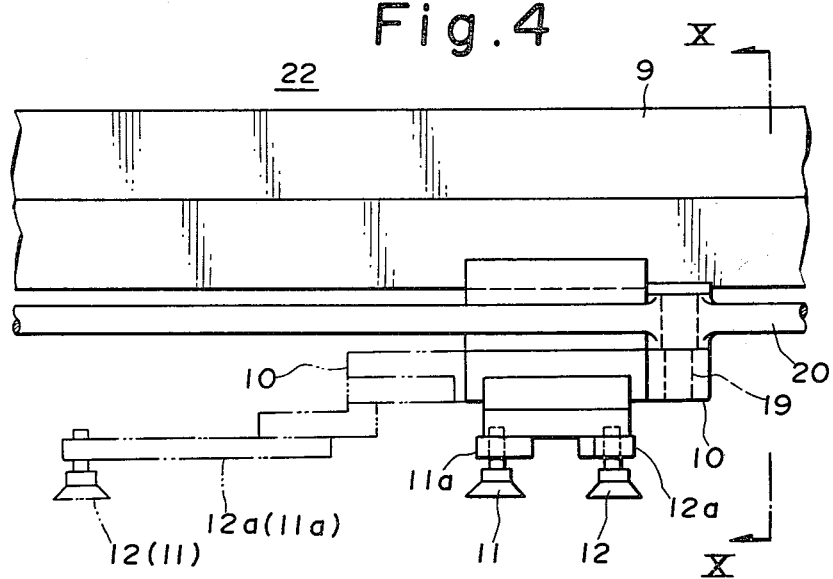

The numeral 13 indicates a slide bar drive cylinder that moves the slide bar 9 horizontally in FIGS. 1 and 2. The cylinder is attached to a supporting frame 14 that cooperates with another supporting frame 15 to support both ends of the slide bar 9. The cylinder 13 has a stroke generally equal to the interval of the working positions $A_1$, $A_2$ and $A_3$. The numerals 16 and 17 indicate cylinders that vertically slide the supporting frames 14 and 15, respectively, and these cylinders, like the cylinders 8 and 13, are driven at a predetermined timing in synchronism with the operation of the machine 1. As shown in FIGS. 3 to 5, the cup holders 10 are pivotally attached to the underside of the slide bar 9 by pivots 18. The holders 10 are also connected to a pivoting bar 20 (generally parallel to the slide bar 9) by pins 19 that fit on one lateral side of the holders 10. The pivoting bar 20 is horizontally slidable by a pivoting cylinder 21 attached to the underside of the supporting frame 14. When the bar 20 is moved, say, to the left, the cups 11 and 12 together with the holders 10 are retracted from the suction position indicated by the solid line in FIG. 3 to the retracted position indicated by the one long and two short dashed line.

A workpiece feeding apparatus generally indicated at 22 essentially consists of the slide bar 9, holders 10, suction cups 11 and 12, cylinder 13, pivoting bar 20 and pivoting cylinder 21, the last two members constituting pivoting mechanism. The numeral 23 indicates a chute by which the workpiece 2 given the final working at position $A_3$ is discharged.

The sequence of the operations of the feed apparatus according to this invention is hereunder described. Suction is applied to the workpiece 2 supplied to the feed position Ao through the pusher feed mechanism 7 at suitable points of the surface by suction cups 11 and 12 that are lowered by the downward motion of the pistons of the cylinders 16 and 17. When the pistons of the cylinders 16 and 17 go up, the workpiece 2 is lifted as it remains held by the suction cups 11 and 12. Then, the slide bar drive cylinder 13 starts to operate, and by the leftward motion of the piston, the workpiece is moved to right above the first working position $A_1$. Then, the pistons of the cylinders 16 and 17 come down to rest the workpiece on the first working position $A_1$, and the cups 11 and 12 which are no longer applying suction to the workpiece are lifted above it by the upward motion of the pistons.

The cups 11 and 12 lifted above the workpiece 2 are in a position to interfere with the movement of the upper mold 6, but by the subsequent motion of the pivoting cylinder 21, the cups are retracted to a position that does not interfere with the motion of the upper mold 6. Stated specifically, the piston of the pivoting cylinder 21 makes a leftward motion to pull the pivoting bar 20 to the left. As a result, the cup holders 10 are pivoted about the pins 18 about 90° to the retracted position indicated by the one long and two short dashed line in FIG. 3. Since the distance between the slide bar 9 and the pivoting bar 20 is less than the length of the arm between the pins 18 and 19, the bar 20 is deflected slightly toward the front of the machine during the pivoting of the holders 10, but the bar 20 has some resiliency and does not break.

The cups 11 and 12 having been retracted to a non-interfering position, the pressing machine 1 can be operated freely and the workpiece 2 is pressed by the downward motion of the upper mold 6. During the downward motion of the mold 6, the piston of the slide bar drive cylinder 13 makes a rightward motion, and in consequence, the cups 11 and 12, which remain in the retracted position, are returned from the position above the first working position $A_1$ to the position above the feed position $A_o$. So are the cups 11 and 12 at the other working positions, and they are returned to above the first, second and third working positions $A_1$, $A_2$ and $A_3$ respectively, while they remain in the retracted position. After completion of the press working, the upper mold 6 makes an upward movement, and in synchronism with this movement, the pivoting cylinder 21 is actuated to move its piston rightward so as to pivotally return the cups 11 and 12 to right above the positions $A_o$, $A_1$, $A_2$ and $A_3$.

The foregoing is the description of one operating cycle of the pressing machine 1 and the feed apparatus 22. By repeating the same cycle of operations, the workpiece 2 that has been given the predetermined working at the first working position $A_1$ is sent to the second and third working positions $A_2$ and $A_3$ where it is subjected to the respective predetermined kinds of working, and then discharged from the pressing machine by sliding down the chute 23. As described above, according to the feed apparatus 22 of this invention, the suction cups 11 and 12 for transporting the workpiece can be returned, as they remain in the retracted posture during the downward movement of the upper mold 6, to the proximity of the working position necessary for the subsequent feed. What is more, the cups can be positioned right above the working position by pivoting the holders 10 during the upward movement of the mold 6, and thus, the proportion of the time that is included in the sequence of the overall operations of the pressing machine 1 and which is spent in only feeding the workpiece 2 can be reduced significantly. The feed apparatus 22 of this invention does not need the space between one working position and the next that has been required for retracting the suction cups in the conventional system, so the working positions $A_1$, $A_2$ and $A_3$ can be brought closer to each other and the pressing machine 1 can be made compact in the direction of the feed of the workpiece 1.

In another embodiment, either of the pins 18 or 19 may be fitted loosely in a pin hole having an elliptic cross section (not shown) so as to prevent the forward deflection of the pivoting bar 20 that occurs during its pivoting motion. In still another embodiment, the pressing machine 1 may have two or more than three working positions instead of three.

As described in the foregoing, the feed apparatus in pressing machine according to this invention is so designed that the means for applying suction to the workpiece are pivoted in the working position and retracted to such a position that they do not interfere with the pressing operation. Therefore, unlike in the conventional system, no space for receiving the retracted suction members need be provided between one working position and the next, and the respective working positions can be brought closer to each other to make a pressing machine that is compact in the direction of the feed of the workpiece. As a further advantage, during the working cycle of the pressing machine, the suction means can be returned, as they remain on the retracted position, to a position that enables the subsequent feed of the workpiece, and in consequence, the proportion of the time that is included in the sequence of the overall operations of the pressing machine 1 and which is spent in only feeding the working piece 2 can be reduced significantly.

What is claimed is:

1. A feeding apparatus in pressing machine which performs sequential predetermined pressing operations on a workpiece at two or more working positions spaced by given intervals, which includes a holder means provided in such a manner that it can be reciprocated between adjacent working positions a suction means that is held by said holder means and which stops applying suction to the workpiece at one of said working positions, and a pivoting mechanism for pivoting said holder means at said working position and retracting said holder means to a position where it does not interfere with the pressing operation of said pressing machine, the workpiece under suction of the suction means at one working position being sent to the next working position by the movement of the holder means and retracted to said non-interfering position by pivoting said holder means after said suction means stops applying suction to the workpiece and before the pressing machine starts to operate.

* * * * *